US00RE41521E

(19) United States
(12) Reissued Patent
Fukushima et al.

(10) Patent Number: US RE41,521 E
(45) Date of Reissued Patent: Aug. 17, 2010

(54) VARIABLE CAPACITY CONDENSER AND POINTER

(75) Inventors: Yasuyuki Fukushima, Saitama-ken (JP); Hiroyuki Fujitsuka, Saitama-ken (JP)

(73) Assignee: Wacom Co., Ltd., Saitama-Ken (JP)

(21) Appl. No.: 11/703,845

(22) Filed: Feb. 8, 2007

Related U.S. Patent Documents

Reissue of:
(64) Patent No.: 6,853,369
Issued: Feb. 8, 2005
Appl. No.: 09/837,368
Filed: Apr. 19, 2001

(30) Foreign Application Priority Data

May 8, 2000 (JP) ..... 2000-134154

(51) Int. Cl.
*G09G 5/00* (2006.01)

(52) U.S. Cl. ..... 345/179; 178/19.01; 178/19.04; 361/283.1; 361/283.2

(58) Field of Classification Search ..... 345/156–184; 178/18.01, 19.01, 19.04; 73/862.69, 718; 361/283.1, 283.2, 280, 287, 291; 33/366; 340/689
See application file for complete search history.

(56) References Cited

U.S. PATENT DOCUMENTS

| | | | |
|---|---|---|---|
| 5,083,383 | A | 1/1992 | Heger |
| 5,206,785 | A | 4/1993 | Hukashima |
| 5,581,052 | A | 12/1996 | Padula et al. |
| 6,252,182 | B1 | 6/2001 | Lai |

FOREIGN PATENT DOCUMENTS

| | | |
|---|---|---|
| JP | 60-153629 | 8/1985 |
| JP | 4-96212 | 3/1992 |
| JP | 04-096212 | 3/1992 |
| JP | 05-275283 | 10/1993 |
| JP | 5-275283 | 10/1993 |

*Primary Examiner*—Srilakshmi K Kumar
(74) *Attorney, Agent, or Firm*—Berenato & White, LLC

(57) ABSTRACT

The present invention provides a variable capacity condenser having fewer components. A variable capacity condenser according to the present invention comprises a dielectric substance, two electrodes, and a flexible electrode. The dielectric substance has two end faces. The two electrodes are disposed on one end face of the dielectric substance. The flexible electrode faces the other end face of the dielectric substance. The flexible electrode is pressible by a pressing member to vary a distance between at least a portion of the flexible electrode and the other end face of the dielectric substance.

56 Claims, 11 Drawing Sheets

VARIABLE CAPACITY CONDENSER AND POINTER

Matter enclosed in heavy brackets [ ] appears in the original patent but forms no part of this reissue specification; matter printed in italics indicates the additions made by reissue.

*Claim to priority. This application claims priority to patent application Ser. No. 2000-134154, filed May 8, 2000 in Japan.*

BACKGROUND OF THE INVENTION

The present invention relates to a variable capacity condenser. More particularly, the present invention relates to a variable capacity condenser to be used in a pointer for inputting a coordinate into a computer.

Prior art variable capacity condensers to be used in a pointer are disclosed in Japanese laid-open patent publication Nos. 4-96212 and 5-275283. FIG. 8 illustrates a pointer in the form of an electric pen (hereinafter referred to as a hard-type electric pen) disclosed in Japanese laid-open patent publication No. 4-96212. The electric pen illustrated in FIG. 8 comprises an electric pen casing 801 and a circuit substrate 814. A resonance circuit is provided on the circuit substrate 814 and cooperates with a pointing device to input a coordinate of the electric pen into a computer (not shown). Although not illustrated in FIG. 8, a pointing device, conventionally referred to as a tablet, typically includes a flat input surface having many loop coils arranged in parallel and in every direction. The tablet detects and inputs into a computer a coordinate position as well as a tool force of the electric pen by an electromagnetic exchange between the resonance circuit of the electric pen and a loop coil in the tablet.

The resonance circuit provided on the circuit substrate 814 includes a fixed condenser 813, a variable capacity condenser, and a coil 803. The variable capacity condenser mainly includes a dielectric substance 808, an electrode 809, and a deposition film 816. The electrode 809 is provided on one end face of the dielectric substance 808 by baking. A pin 811 electrically connects the electrode 809 to a terminal in the resonance circuit. The deposit film 816, a second electrode, faces the other end face of the dielectric substance 808. A pin 812 electrically connects the deposit film 816 to another terminal in the resonance circuit.

The variable capacity condenser further includes a spacer 807 and a silicon rubber 815. The spacer 807 is positioned between the other end face of the dielectric substance 808 and the deposit film 816. The silicon rubber 815 is positioned between the deposit film 816 and a core holder 804. As illustrated in FIG. 8, an upper switching case 810 and a lower switching case 805 clip the components of the variable capacity condenser (dielectric substance 808, the electrode 809, the pin 811, the spacer 807, the deposit film 816, the pin 812, and the silicon rubber 815) as well as the core holder 804.

As illustrated in FIG. 8, a core 802 has a pen point protruding outside the electric pen casing 801. As pressure is applied to the pen point, the core 802 slides through a ferrite core 823 having coils 803 would therearound. The core holder 804 provided at the back end of the core 802 then presses the deposit film 816 via the silicon rubber 815 and decreases the distance between a portion of the deposit film 816 and the other end of the dielectric substance 808. A portion of the deposit film 816 contacts the other end face of the dielectric substance 808 and the contact area increases as the pressure applied to the pen point increases. As the contact area increases, the air disposed between the deposit film 816 and the other end face of the dielectric substance 808 is expelled. Consequently, the capacity of the variable capacity condenser changes as less air contributes as a dielectric material.

As a result, a resonance frequency of the resonance circuit is deviated because the combined capacity of the variable capacity condenser and the fixed condenser 813 changes. A pointing device (e.g., a tablet) detects this deviant resonance frequency, which depends on the amount of pressure applied to the pent point of the core 802. FIG. 11 illustrates a tool force detected by a pointing device versus a load applied to the pen point of the hard-type electric pen shown in FIG. 8.

In the hard-type electric pen shown in FIG. 8, the ferrite core 823 is a cylindrical core made of L6 member. The ferrite core 823 has an outer diameter of 4 mm, an inner diameter of 2 mm, and a length of 17.5 mm. The coil 803 is a wire of ULAP7/0.07 wound around the ferrite core 823 thirty seven turns. The coil 803 contacts the surface of the ferrite core 823 and is wound around without any gaps between the turns. The coil 803 has an inductance L=26 μH, Q=145 (a frequency of 500 kHz). The dielectric substance 808 is a ceramic with a titanic acid barium system and has an outer diameter of 4 mm and a thickness of 1 mm. Please note that the outer diameter of the dielectric substance 808 and that of the ferrite cover 823 are the same. FIG. 8, showing the outer diameter of the dielectric substance 808 being greater than that of the ferrite core 823, is not drawn to scale. The electrode 809 is deposited on the one end face of the dielectric substance 808. The other end face of the dielectric substance 808 is mirror-finished. The silicon rubber 815 has a thickness of 0.4 mm and an outer diameter of 4 mm. As the spacer 807, UPILEX™ of 40 micrometers is used. The spacer 807 is toroidal in shape and has an outer diameter of 4 mm and an inner diameter of 3.3 mm. As the deposit film 816, UPILEX™ of 75 micrometers is used. Nickel chrome having a thickness of 1000 angstroms is deposited on the deposit film 816.

FIG. 7 illustrates a pointer in the form of an electric pen (hereinafter referred to as a soft-type electric pen) disclosed in Japanese laid-open patent publication No. 5-275283. The electric pen shown in FIG. 7 differs from the hard-type electric pen shown in FIG. 8 in its various capacity condenser. By having a modified variable capacity condenser, the electric pen shown in FIG. 7 reacts to a lighter load.

In the soft-type electric pen, a conductive rubber 706, comprising a mixture of synthetic rubber and conductive particles, replaces the deposit film 816 and the silicon rubber 815 of the hard-type electric pen. In addition, the thickness and inner diameter of a spacer 707 change from those of the spacer 807. Furthermore, instead of a mirror-finished surface of the dielectric substance 808, the other end face of a dielectric substance 708 is a harsh surface ground by a file No. 320. These modifications produce a tool force-load property illustrated in FIG. 10.

A comparison of FIGS. 10 and 11 reveals that the soft-type electric pen reacts to a lighter touch than the hard-type electric pen. For example, FIG. 10 shows that the soft-type electric pen generates a tool force of about 55 when a load of 50 g is applied. For the same applied load of 50 g, however, FIG. 11 shows that the hard-type electric pen generates a tool force of about 30.

In the soft-type electric pen, a ferrite cover 723 is a cylindrical core made of L6 member. The ferrite core 723 has an outer diameter of 4 mm, an inner diameter of 2 mm, and a length of 17.5 mm. The coil 703 is a wire of ULAP7/0.07 wound around the ferrite core 723 thirty seven turns. The coil 703 contacts the surface of the ferrite core 723 and is wound around without any gaps between the turns. The coil 703 has an inductance L=26 μH, Q=145 (a frequency of 500 kHz). A dielectric substance 708 is a ceramic with a titanic acid barium system and has an outer diameter of 4 mm and a thickness of 1 mm. Please note that the outer diameter of the dielectric substance 708 and that of the ferrite core 723 are the same. FIG. 7, showing the outer diameter of the dielectric substance 708 being greater than that of the ferrite core 723, is not drawn to scale. An electrode 709 is burned into one end face of the dielectric substance 708. The other end face of the dielectric substance 708 is ground by a file No. 320. As the spacer 707, UPILEX™ of 75 micrometers is used. The spacer 707 is toroidal in shape and has an outer diameter of 4 mm and an inner diameter of 2.4 mm. The conductive rubber 706 has a thickness of 0.4 mm and an outer diameter of 4 mm.

The conductive rubber 706 comprises a mixture of synthetic rubber and carbon particles. The conductive rubber 706 functions as an electrode because the carbon particles are conductive. The surface of the conductive rubber 706 is rough to some extent. As mentioned above, unlike the dielectric substance 808 in the hard-type electric pen, the other end face of the dielectric substance 708 facing the conductive rubber 706 is ground by a file No. 320. Accordingly, a high exfoliation can be achieved after the conductive rubber 706 contacts the other end face of the dielectric substance 708. Moreover, because of the high flexibility of the conductive rubber 706, the capacity of the variable capacity condenser in the soft-type electric pen can be varied with a higher touch.

The conventional hard-type and soft-type electric pens described above have many components, including common components such as a core bladder, an upper switching case, a lower switching case, and pins for two electrodes. Because of these many components, the manufacturing cost of the conventional electric pens is high. Also, the conventional electric pens require many manufacturing and assembly steps. Furthermore, the other diameter of the conventional electric pens cannot be narrowed beyond a certain size because they have to accommodate the upper and lower switching case.

SUMMARY OF THE INVENTION

Accordingly, the present invention is directed to a variable capacity condenser and a pointer that obviate one or more of the limitations and disadvantages of prior art variable capacity condensers and pointers. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the invention is directed to a variable capacity condenser comprising a dielectric substance, two electrodes, and a flexible electrode. The dielectric substance has two end faces. The two electrodes are disposed on one end face of the dielectric substance. The flexible electrode faces the other end face of the dielectric substance. The flexible electrode is pressible by a pressing member to vary a distance between at least a portion of the flexible electrode and the other end face of the dielectric substance.

In another aspect, the invention is directed to a pointer comprising a casing, a circuit, and a pressing member. The circuit is disposed within the casing. The circuit includes a variable capacity condenser comprising a dielectric substance, two electrodes, and a flexible electrode. The dielectric substance has two end faces. The two electrodes are disposed on one end face of the dielectric substance. The flexible electrode faces the other end face of the dielectric substance. The pressing member presses the flexible electrode of the variable capacity condenser to vary a distance between at least a portion of the flexible electrode and the other end face of the dielectric substance.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENTS

Figure 1:
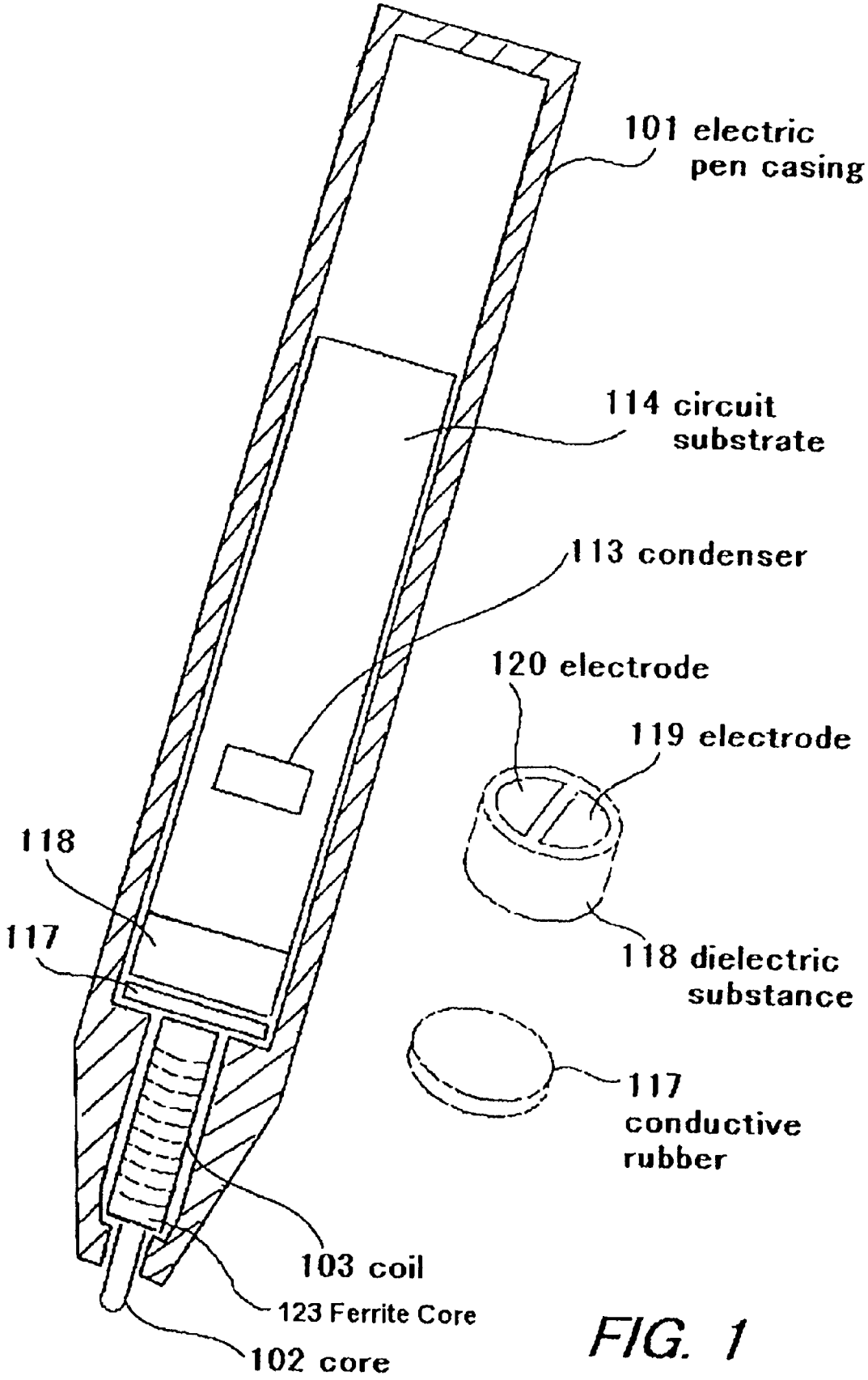
FIG. 1 is a sectional view of an exemplary electric pen according to the present invention showing the components of a variable capacity condenser in an exploded view.

Reference will now be made in detail to the presently preferred embodiment of the present invention, examples of which are illustrated in the accompanying drawings.

In accordance with the present invention, there is provided a pointer comprising a casing, a circuit, and a pressing member. The circuit is disposed within the casing. The circuit includes a variable capacity condenser comprising a dielectric substance, two electrodes, and a flexible electrode. The dielectric substance has two end faces. The two electrodes are disposed on one end face of the dielectric substance. The flexible electrode faces the other end face of the dielectric substance. The pressing member presses the flexible electrode of the variable capacity condenser to vary a distance between at least a portion of the flexible electrode and the other end face of the dielectric substance.

In the illustrated embodiment shown in FIG. 1, a pointer is an electric pen comprising an electric pen casing 101, a circuit substrate 114, a variable capacity condenser to be described in more detail below, and a coil 103. Except for a pen point of a core 102 protruding outside the electric pen casing 101, all components of the electric pen are disposed within the electric pen casing 101.

The electric pen includes a resonance circuit, which cooperates with a pointing device, such as a tablet (not shown), to input a coordinate as well as a tool force of the electric pen into a computer (not shown). A tablet typically includes a flat input surface having many loop coils arranged in parallel and in every direction. The tablet detects and inputs into a computer a coordinate position as well as a tool force of the electric pen by an electromagnetic exchange between the resonance circuit of the electric pen and a loop coil in the tablet. In the illustrated embodiment shown in FIG. 1, a resonance circuit mainly comprises a fixed condenser 113 provided with the circuit substrate 114, a variable capacity condenser to be described in more detail below, and the coil 103.

In the illustrated embodiment shown in FIG. 1, a variable capacity condenser comprises a dielectric substance 118 having two end faces, two electrodes 119 and 120 disposed on one end face of the dielectric substance 118, and a conductive rubber 117 facing the other end face of the dielectric substance 118. The conductive rubber 117 is flexible and functions as an electrode of the variable capacity condenser. The variable capacity condenser illustrated in FIG. 1 have two condensers, one between the electrode 119 and the conductive rubber 117 and another between the electrode 120 and the conductive rubber 117. Therefore, the integrated capacity of the variable capacity condenser is obtained between the electrode 119 and the electrode 120. Preferably, the two electrodes 119 and 120 are semicircular disks disposed on one end face of the dielectric substance 118 by baking. As shown in FIG. 1, the one end face of the dielectric substance 118 includes a portion separating the two electrodes 119 and 120 by a predetermined distance.

Figure 6:
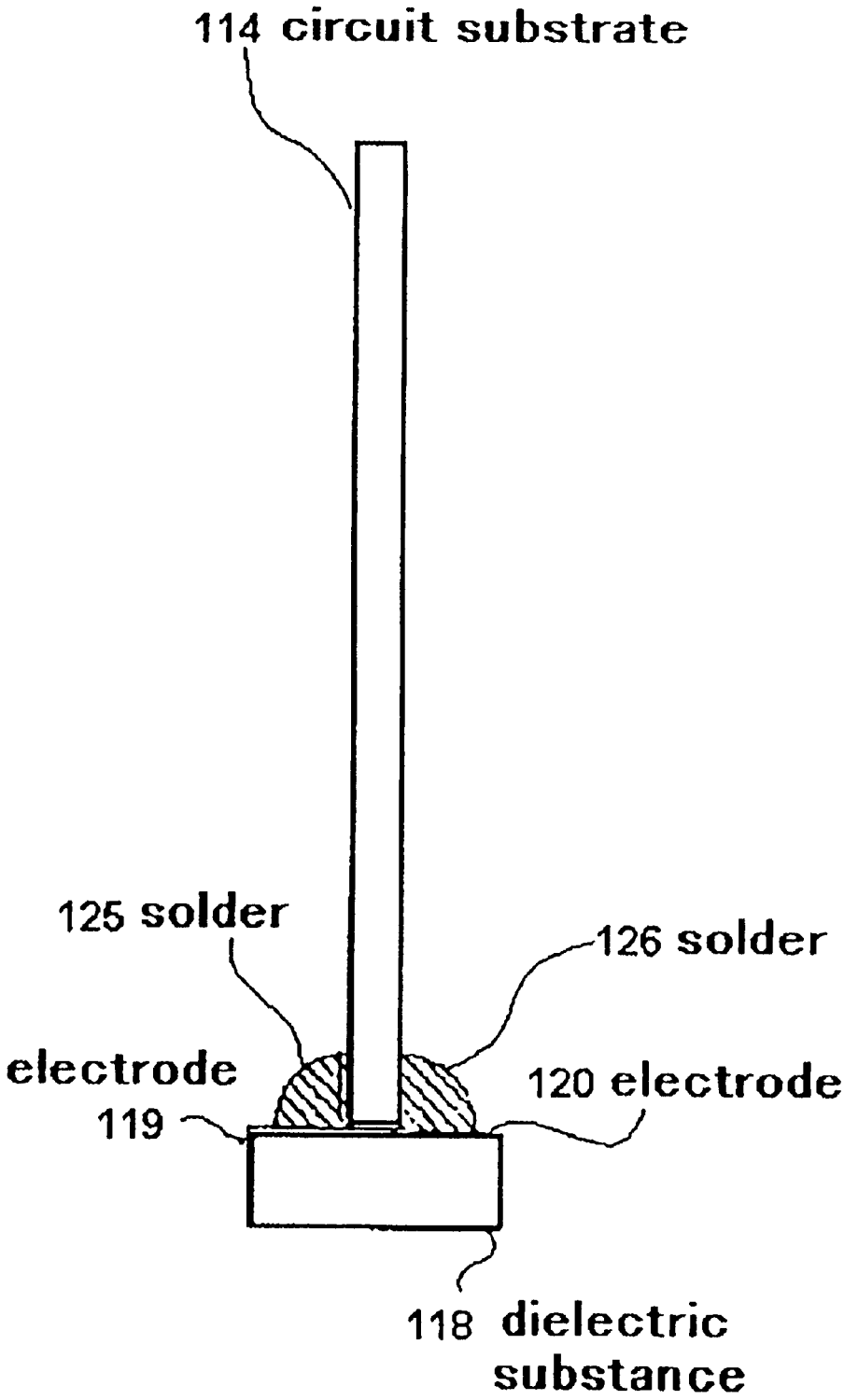
FIG. 6 is a sectional view of a circuit substrate and a dielectric substance according to the present invention illustrating their soldered connection.
Figure 7:
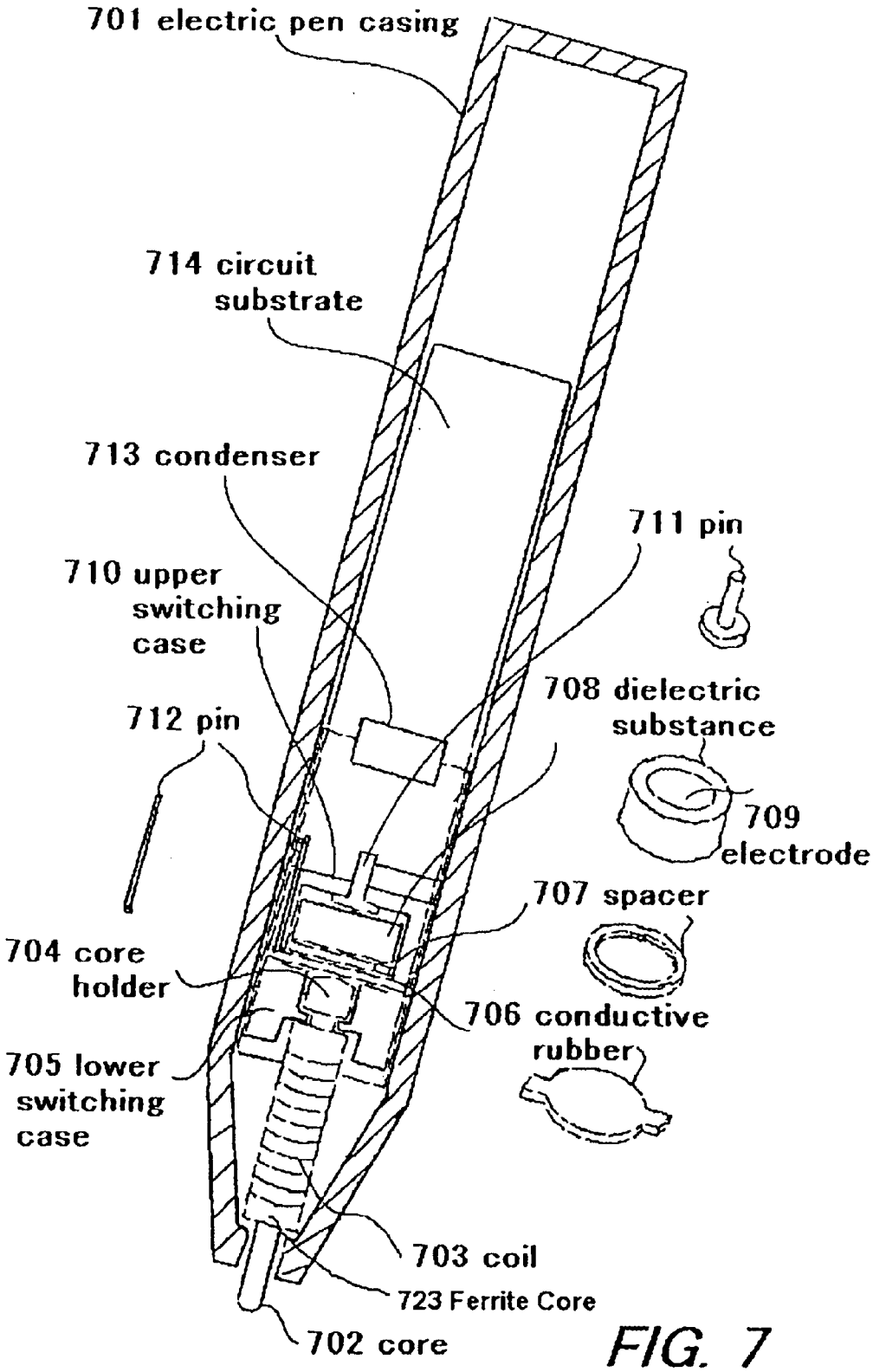
FIG. 7 (Prior Art)
FIG. 7 is a section view of a conventional soft-type electric pen showing the components of a variable capacity condenser in an exploded view.
Figure 8:
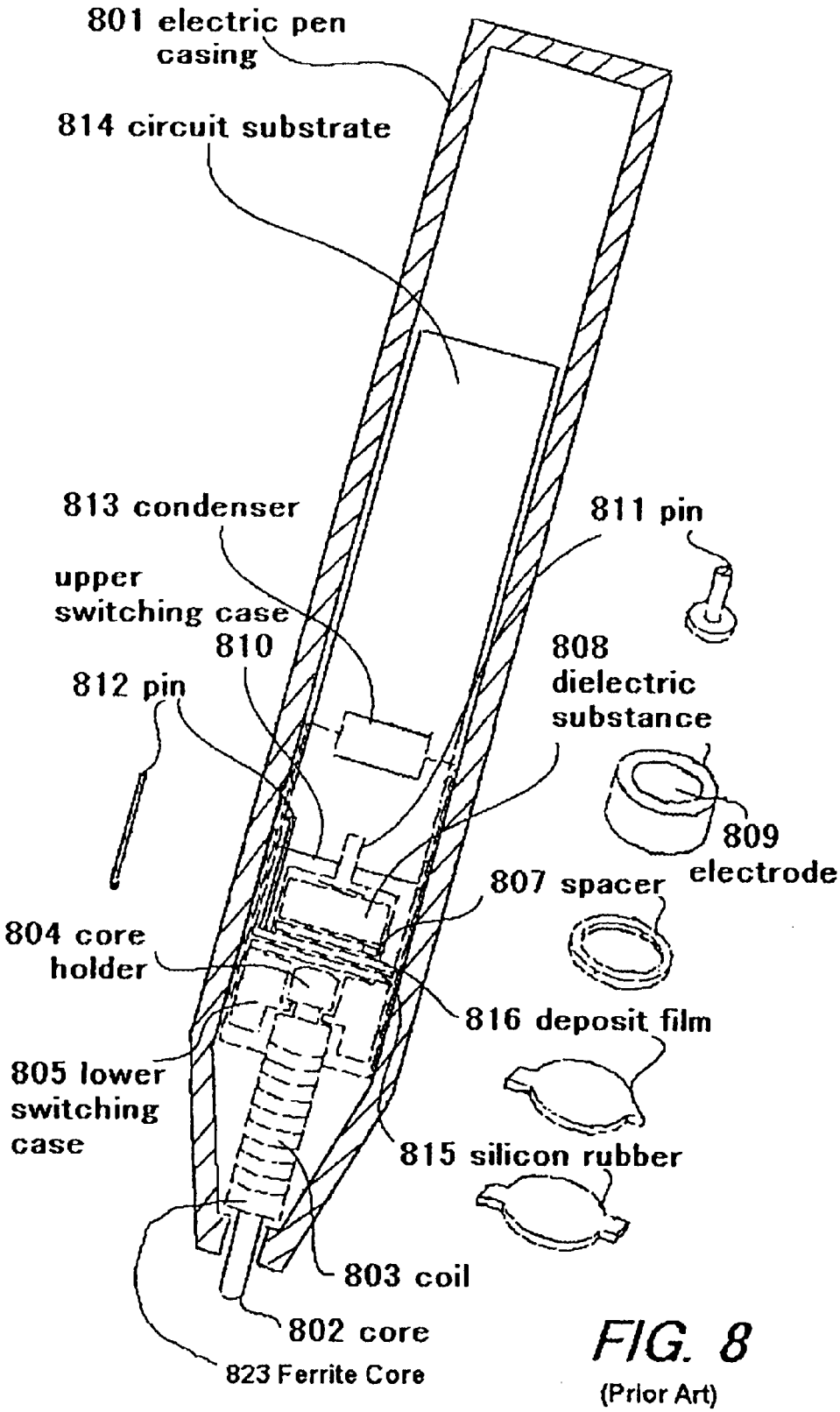
FIG. 8 (Prior Art)
FIG. 8 is a section view of a conventional hard-type electric pen showing the components of a variable capacity condenser in an exploded view.

As illustrated in FIGS. 1 and 6, the circuit substrate 114 is an elongated rectangle disposed in the longitudinal direction of the electric pen casing 101. The circuit substrate 114 has an end face abutting the dielectric substance 118 at the portion separating the two electrodes 119 and 120. Preferably, the thickness of the circuit substrate 114 is substantially the same as the predetermined distance of the portion of the dielectric substance 118 separating the two electrodes 119 and 120.

The circuit substrate 114 is a double-sided substrate having front and back sides. Each of the front and back sides of the circuit substrate 114 has a portion of the resonance circuit printed thereon. Each portion of the resonance circuit printed on the front and back sides of the circuit substrate 114 includes a conducting portion. The conducting portions provided on the front and back sides of the circuit substrate 114 are electrically connected to two electrodes 119 and 120, respectively.

The conducting portions are preferably provided around the end face of the circuit substrate 114 abutting the dielectric substance 118 and are electrically connected to the two electrodes 119 and 120 by soldering as illustrated in FIG. 6. In addition to electrically connecting the conducting portions to the two electrodes 119 and 120, solders 125 and 126 mechanically connect the circuit substrate 114 to the dielectric substance 118 and maintain the circuit substrate 114 perpendicular to the one end face of the dielectric substance 118. To maintain the circuit substrate 114 stationary, a portion of the inner configuration of the electric pen casing 101 presses the other end face of the circuit substrate 114 opposite from the end face abutting the dielectric substance 118.

In the illustrated embodiment shown in FIG. 1, the core 102 is made integral with a ferrite core 123 around which the coil 103 is wound. Thus, when pressure is applied to the pen point of the core 102 protruding outside the electric pen casing 101, the pen point of the core 102 transmits the pressure to the ferrite core 123. The ferrite core 123 then presses the conductive rubber 117 toward the other end face of the dielectric substance 118 and decreases the distance between a portion of the conductive rubber 117 and the other end face of the dielectric substance 118. A portion of the conductive rubber 117 contacts the other end face of the dielectric substance 118 and the contact area increases as the pressure applied to the pen point increases. As the contact area increases, the air disposed between the conductive rubber 117 and the other end face of the dielectric substance 1188 is expelled. Consequently, the capacity of the variable capacity condenser changes as less air contributes as a dielectric material.

Figure 9:
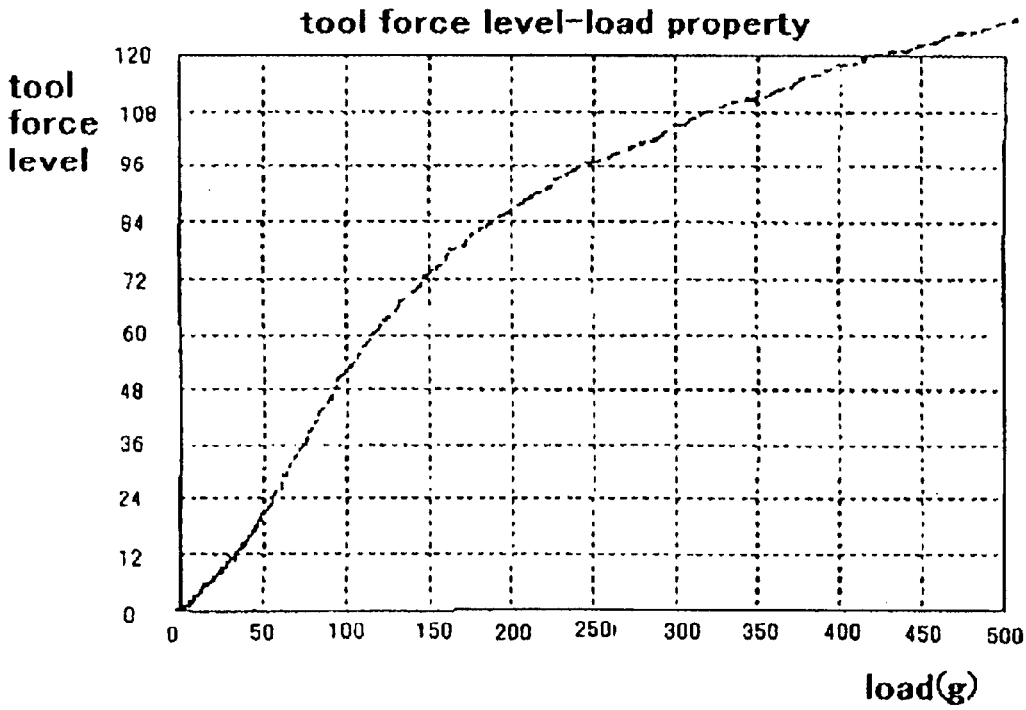
FIG. 9 is a graph showing a tool force-load property of an electric pen according to the present invention.
Figure 10:
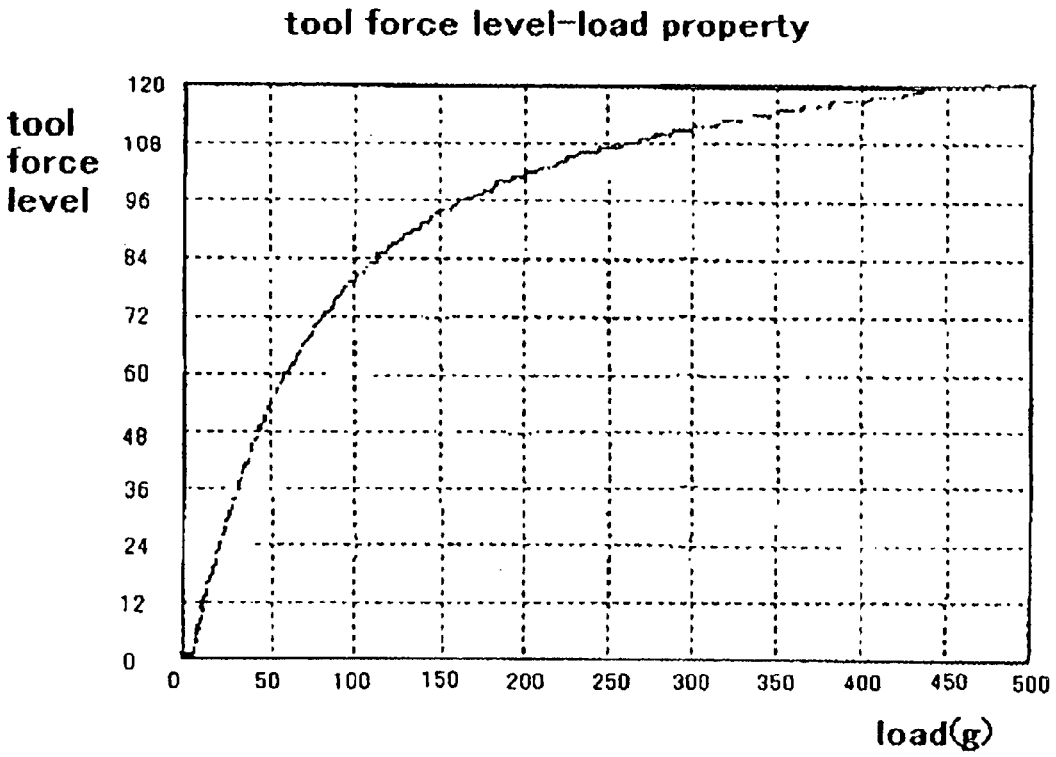
FIG. 10 (Prior Art)
FIG. 10 is a graph showing a tool force-load property of a conventional soft-type electric pen.
Figure 11:
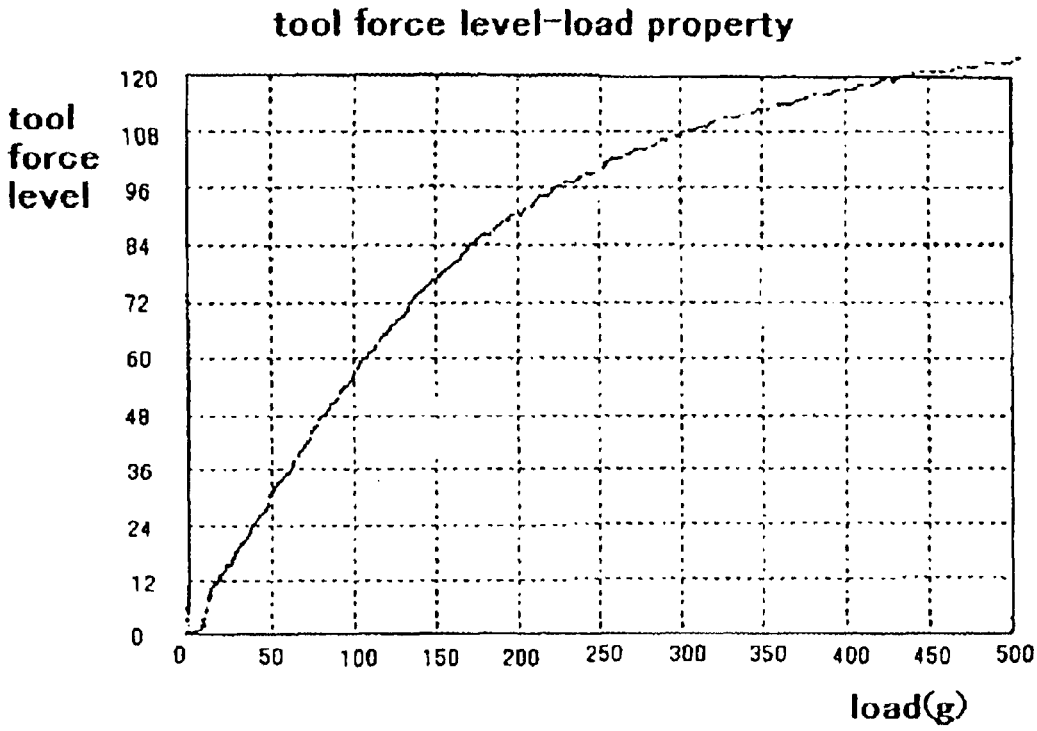
FIG. 11 (Prior Art)
FIG. 11 is a graph showing a tool force-load property of a conventional hard-type electric pen.

Therefore, the integrated capacity of the variable capacity condenser varies slightly depending on the amount of pressure applied to the pen point. This varying capacity in turn slightly vary the resonance frequency of the resonance circuit. A pointing device (e.g., a tablet) detects the variance of the resonance frequency of the resonance circuit. FIG. 9 shows a tool force-load property of an electric pen according to the present invention.

In the illustrated embodiment shown in FIG. 1, the ferrite core 123 is a cylindrical column made of L6 member and has an outer diameter of 4.0 mm and a length of 17.5 mm. The coil 103 is a wire made of a Litz line 2-ULAP7/0.07 wound around the ferrite core 123 thirty eight turns in the first layer and thirty five turns in the second layer. The first layer of the coil 103 contacts the surface of the ferrite core 123 while the second layer of the coil 103 is wound around the first layer. Both the first and second layers of the coil 103 are wound without any gaps between the turns. The coil 803 has an inductance L=100 μH, Q=200 (a frequency of 500 kHz). The dielectric substance 118 employs a titanic acid strontium system and has an outer diameter of 4 mm and a thickness of 1 mm. The conductive rubber 117, comprising a mixture of synthetic rubber and conductive particles, has a thickness of 0.4 mm and an outer diameter of 4.0 mm. Preferably, carbon particles are used as the conductive particles. The surface of the conductive rubber 706 is rough to some extent. The one end face of the dielectric substance 118 facing the conductive rubber 117 is ground using a file No. 320.

Figure 2:
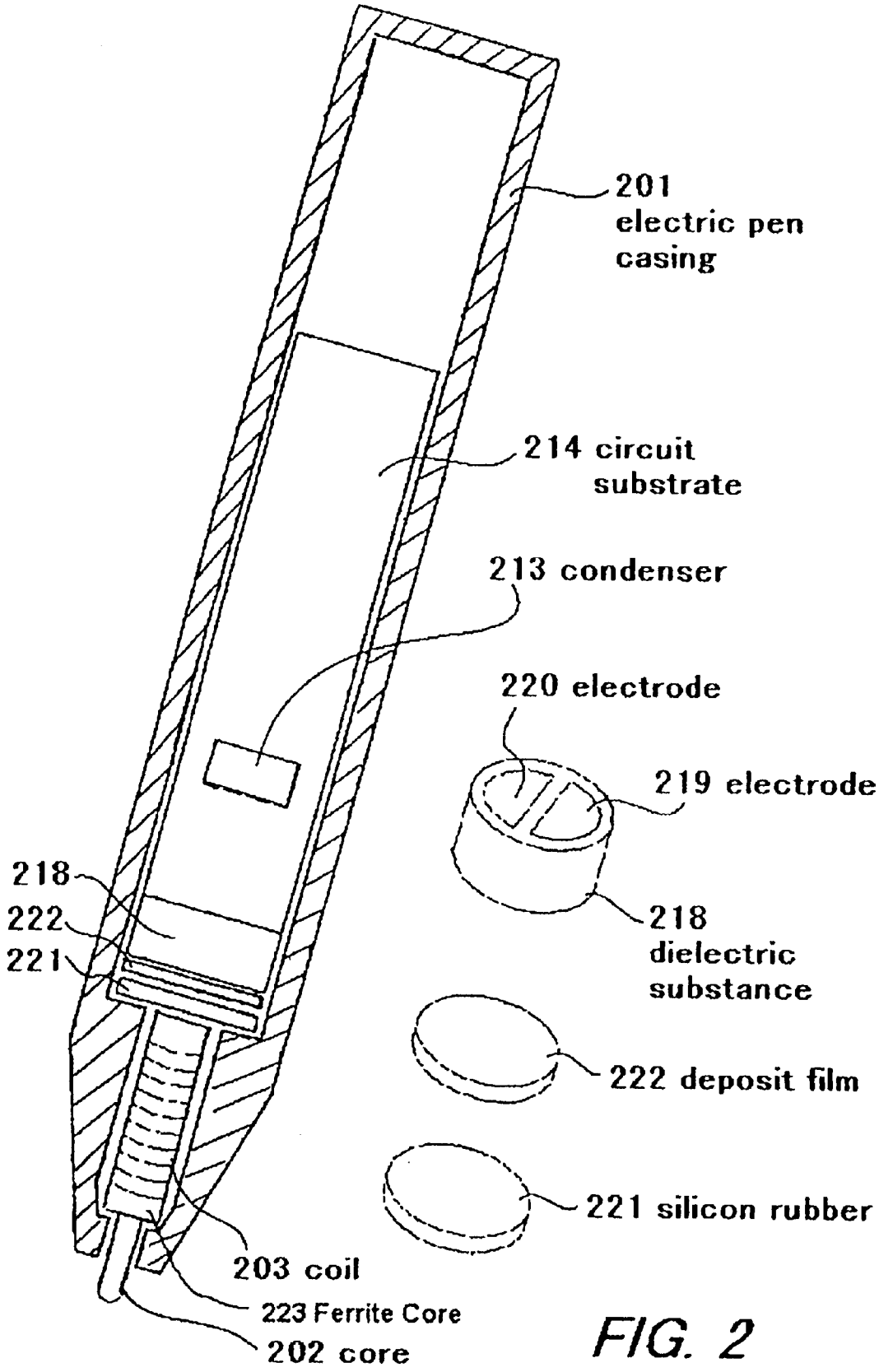
FIG. 2 is a sectional view of another exemplary electric pen according to the present invention showing the components of a variable capacity condenser in an exploded view.

FIG. 2 illustrates another embodiment of an electric pen having a variable capacity condenser. In the illustrated embodiment shown in FIG. 2, a combination of a deposition film 222 and a silicon rubber 221 replaces the conductive rubber 117 shown in FIG. 1. The silicon rubber 221 is positioned between the deposit film 222 and a ferrite core 223. As the deposition film 222, UPILEX™ of 75 micrometers can be utilized. Nickel chrome having a thickness of 1000 angstroms is deposited on the deposit film 222. The silicon rubber 221 has a thickness of 0.4 mm and an outer diameter of 4.0 mm. All other aspects of this embodiment are the same as those shown in FIG. 1.

Figure 3:
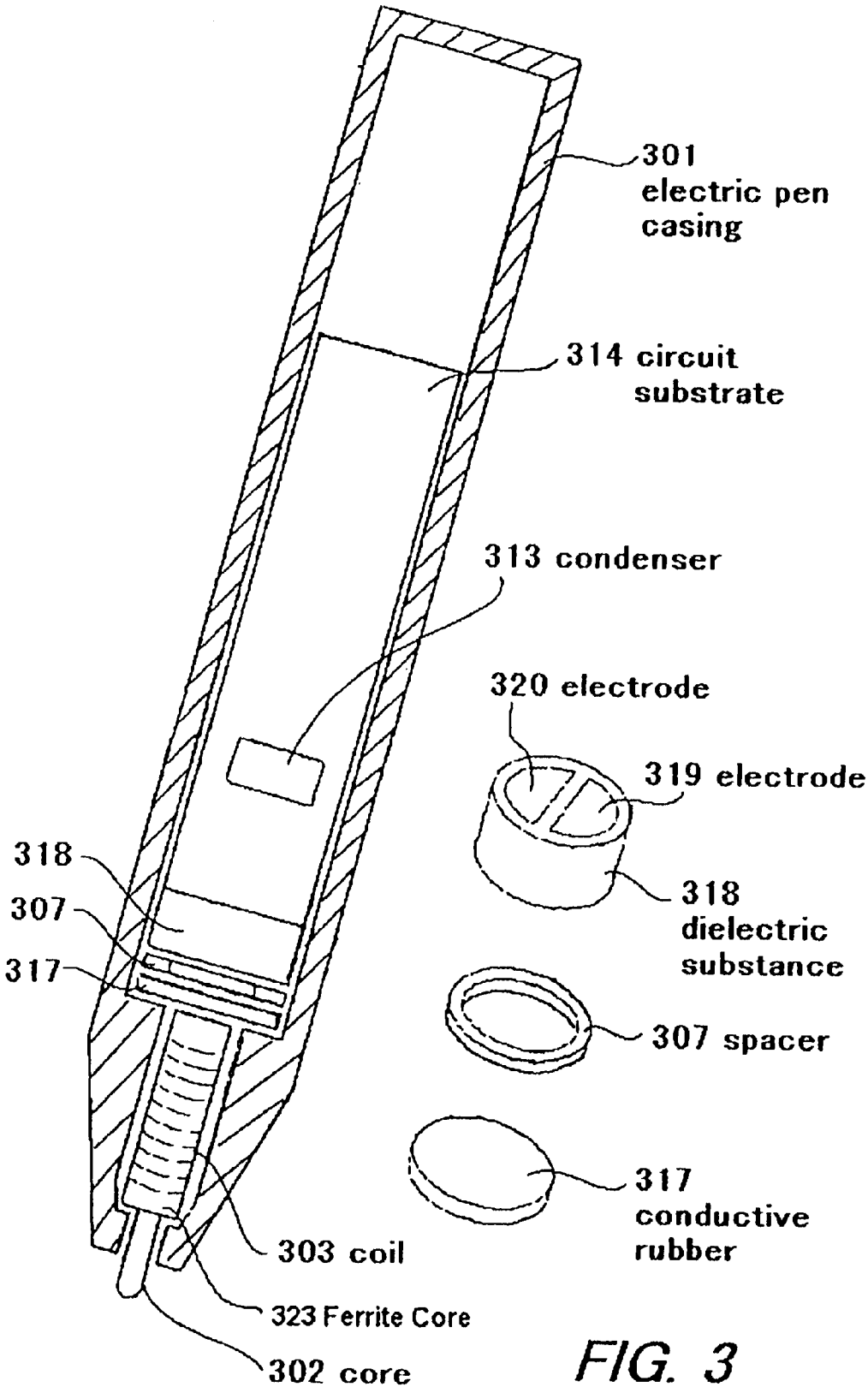
FIG. 3 is a sectional view of yet another exemplary electric pen according to the present invention showing the components of a variable capacity condenser in an exploded view.

FIG. 3 illustrates yet another embodiment of an electric pen having a variable capacity condenser. In the illustrated embodiment shown in FIG. 3, a spacer 307 is added to the embodiment shown in FIG. 1. The spacer 307 is positioned between a conductive rubber 317 and the other end face of the dielectric substance 318. Depending on the inductance of a coil 303 and the capacity of a condenser 313, this embodiment including the spacer 307 may be appropriate. Furthermore, the extent of the roughness in the other end face of a dielectric substance 318 facing the conductive rubber 317 determines whether the spacer 307 is necessary or not. All other aspects of this embodiment are the same as those shown in FIG. 1.

Figure 4:
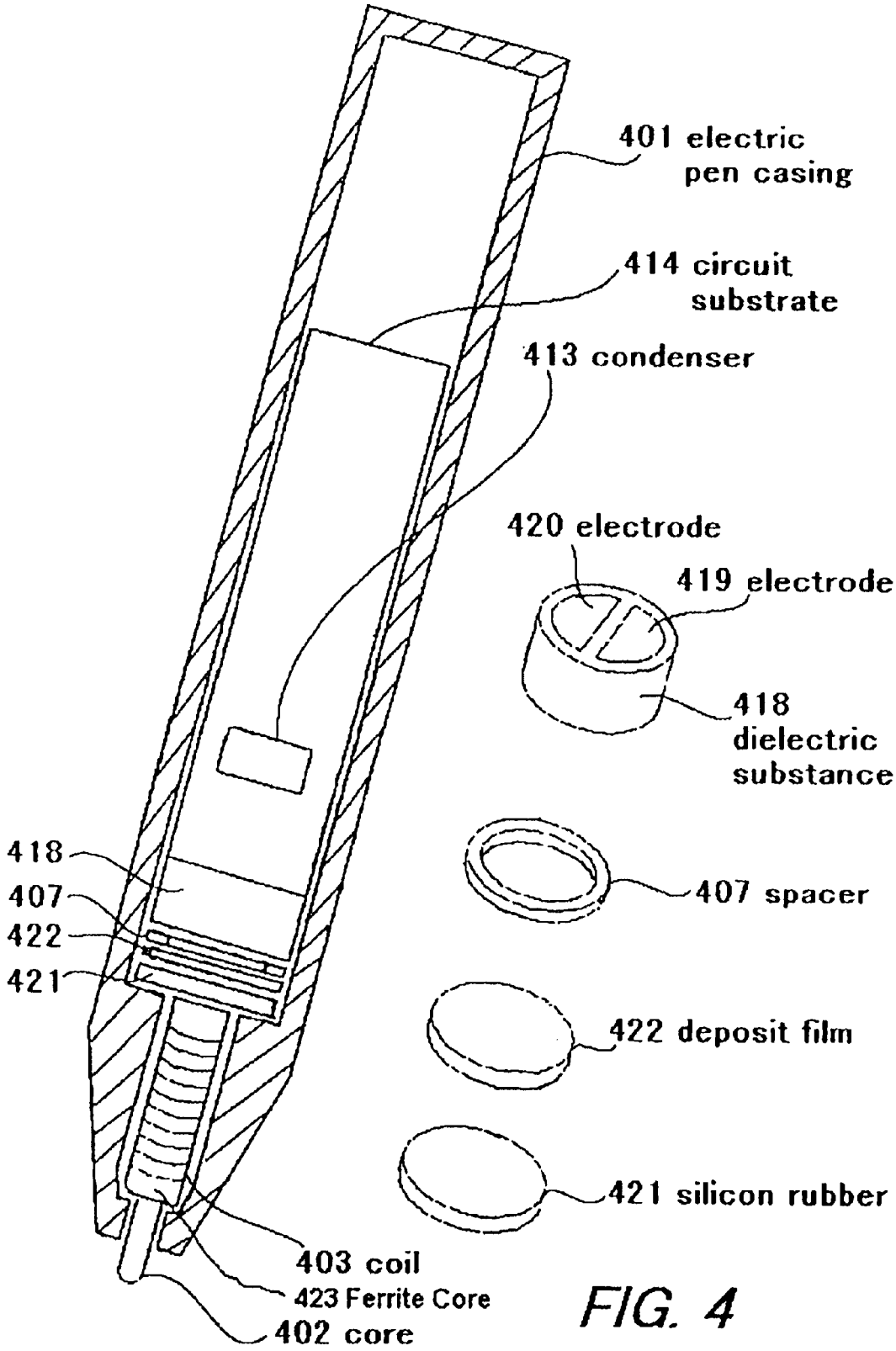
FIG. 4 is a sectional view of yet another exemplary electric pen according to the present invention showing the components of a variable capacity condenser in an exploded view.

FIG. 4 illustrates yet another embodiment of an electric pen having a variable capacity condenser. In the illustrated embodiment shown in FIG. 4, a spacer 407 is added to the embodiment shown in FIG. 2. The spacer 407 is positioned between a deposit film 422 and the other end face of a dielectric substance 418. All other aspects of this embodiment are the same as those shown in FIG. 2.

Figure 5:
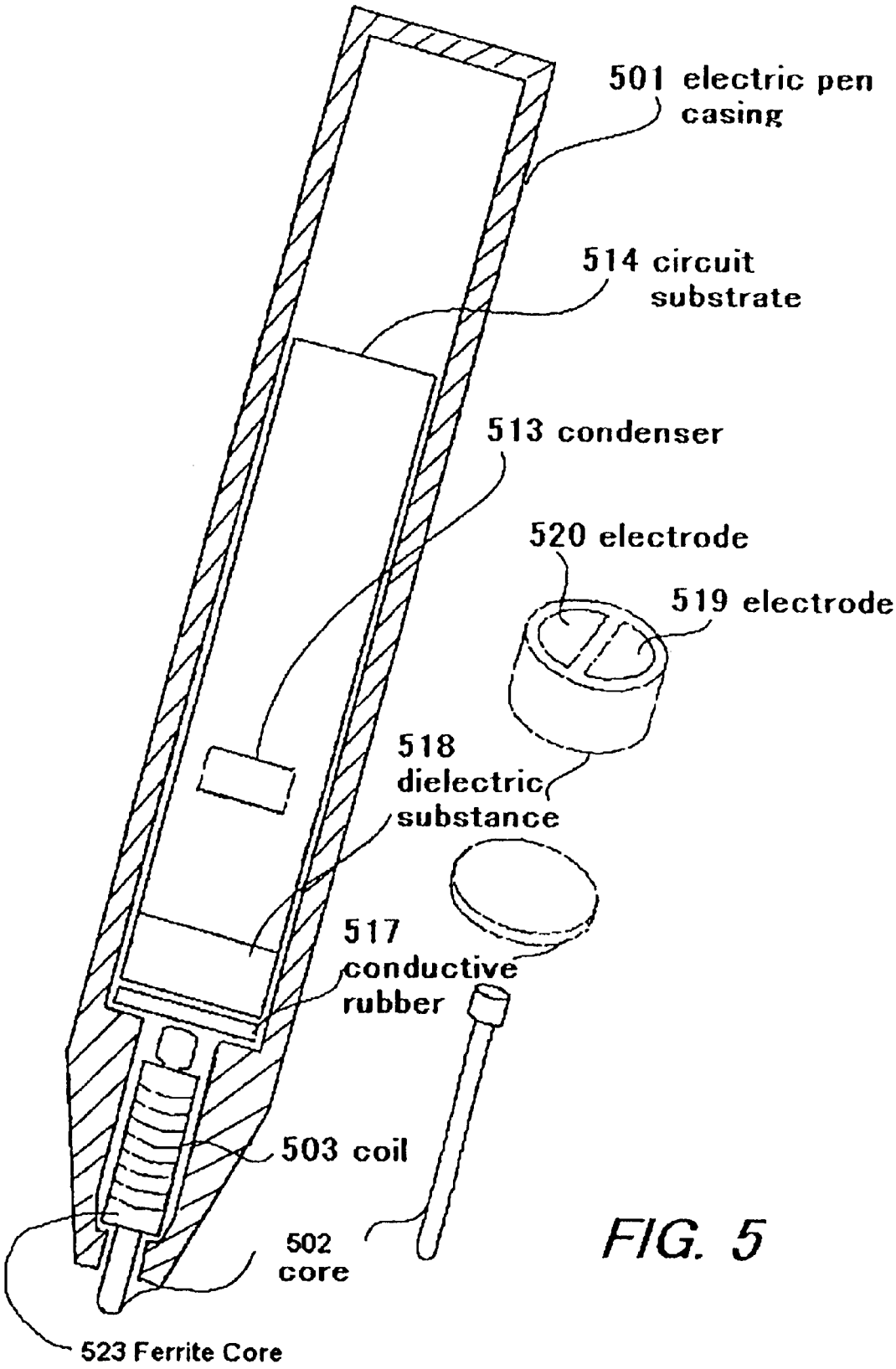
FIG. 5 is a sectional view of yet another exemplary electric pen according to the present invention showing the components of a variable capacity condenser and a pressing member in an exploded view.

FIG. 5 illustrates yet another embodiment of an electric pen having a variable capacity condenser. In the illustrated embodiment shown in FIG. 5, a core 502 slides through a hollow cylindrical ferrite core 523. Therefore, the back side of the core 502 instead of the back side of the ferrite core 523 presses a conductive rubber 517 toward the other end face of a dielectric substance 518. The back side of the core 502, which is greater than the inner diameter of the ferrite core 523, prevents the core 502 from disengaging from the ferrite core 503. All other aspects of this embodiment are the same as those shown in FIG. 1.

Employing the variable capacity condenser of the present invention describes the number of components to be contained within an electric pen. Fewer components in turn decrease the manufacturing cost of an electric pen. Specifically, the present invention eliminates the need to contain upper and lower switching cases and their related pins in an electric pen housing by disposing two electrodes on one end face of a dielectric substance and electrically connecting them to conduction portions of a resonance circuit provided on a circuit substrate.

In addition, the variable capacity condenser of the present invention can be contained in a narrow electric pen casing because fewer components are needed. Because the variable capacity condenser of the present invention does not need upper and lower switching cases and their related pins, an inner diameter of an electric pen casing needs to be only slightly larger than the outer diameter of a dielectric substance. Thus, for a given thickness of an electric pen casing, an outer diameter of an electric pen casing can be narrower than that of a conventional electric pen casing. For example, if the outer diameter of a dielectric substance is 4 mm and the thickness of an electric pen casing is about 1.25 mm, the outer diameter of the electric pen casing can be about 6.5 mm because the inner diameter of an electric pen casing needs to be slightly larger than 4 mm. However, given the same outer diameter of a dielectric substance and the same thickness of an electric pen casing, a conventional electric pen cannot have the outer diameter of an electric pen casing about 6.5 mm because it has to accommodate upper and lower switching cases and their related pins.

It will be apparent to those skilled in the art that various modifications and variations can be made in the assembly of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A variable capacity condenser comprising:

a dielectric substance of an electric pointer device having two end faces;

two electrodes disposed on one end face of the dielectric substance; and a flexible electrode facing the other end face of the dielectric substance and pressible by a pressing member to vary a distance between at least a portion of the flexible electrode and the other end face of the dielectric substance.

2. The variable capacity condenser according to claim 1, wherein the flexible electrode comprises a mixture of rubber and conductive particles.

3. The variable capacity condenser according to claim 2, wherein the conductive particles are carbon particles.

4. The variable capacity condenser according to claim 1, wherein the flexible electrode is a deposition film.

5. The variable capacity condenser according to claim 1, further comprising an elastic member positioned between the flexible electrode and the pressing member.

6. The variable capacity condenser according to claim 1, further comprising a spacer positioned between the other end face of the dielectric substance and the flexible electrode.

7. A pointer comprising:

a casing;

a circuit disposed within the casing, the circuit including a variable capacity condenser comprising:

a dielectric substance having two end faces;

two electrodes disposed on one end face of the dielectric substance; and a flexible electrode facing the other end face of the dielectric substance; and a pressing member to press the flexible electrode of the variable capacity condenser to vary a distance between at least a portion of the flexible electrode and the other end face of the dielectric substance.

8. The pointer according to claim 7, wherein the flexible electrode of the variable capacity condenser comprises a mixture of rubber and conductive particles.

9. The pointer according to claim 8, wherein the conductive particles are carbon particles.

10. The pointer according to claim 7, wherein the flexible electrode of the variable capacity condenser is a deposition film.

11. The pointer according to claim 7, wherein the variable capacity condenser further comprises an elastic member positioned between the flexible electrode and the pressing member.

12. The pointer according to claim 7, wherein the variable capacity condenser further comprises a spacer positioned between the other end face of the dielectric substance and the flexible electrode.

13. The pointer according to claim 7, wherein the casing is pen-shaped and the pointer includes a core having a pen point protruding outside the casing to transmit pressure applied thereto to the variable capacity condenser.

14. The pointer according to claim 13, wherein the pressing member is a ferrite core made integral with the core and having a coil wound therearound.

15. The pointer according to claim 13, wherein the pressing member is the core slidable through a ferrite core having a coil wound therearound.

16. The pointer according to claim 7, further comprising a circuit substrate having front and back sides, each of the front and back sides including at least a portion of the circuit printed thereon, the at least a portion of the circuit printed on the front side including a conducting portion electrically connected to one of the two electrodes and the at least a portion of the circuit printed on the back side including a conducting portion electrically connected to the other of the two electrodes.

17. The pointer according to claim 16, the conducting portions are soldered to the two electrodes.

18. The pointer according to claim 16, wherein the conducting portions are provided around an end face of the circuit substrate abutting the one end face of the dielectric substance at a portion separating the two electrodes by a predetermined distance.

19. The pointer according to claim 18, wherein the circuit substrate has a thickness substantially equal to the predetermined distance of the portion of the dielectric substance separating the two electrodes.

*20. A variable capacity condenser comprising: a dielectric region of an electric pointer including a dielectric substance, the dielectric region having two end portions; two electrodes disposed at one end portion of the dielectric region; and a flexible electrode facing the other end portion of the dielectric region and pressible by a pressing member to vary a distance between at least a portion of the flexible electrode and the other end portion of the dielectric region.*

*21. The variable capacity condenser according to claim 20, further comprising a spacer positioned between the other end portion of the dielectric region and the flexible electrode.*

*22. The variable capacity condenser according to claim 20, wherein the dielectric substance has a disc shape that defines the shape of the dielectric region.*

*23. A variable capacity condenser, comprising:*

*a dielectric region of an electric pointer defined by at least one dielectric substance disposed therein, the dielectric region having a substantially cylindrical shape with a circumferential side portion and circular end faces disposed on opposite sides of the circumferential side portion;*

*two electrodes disposed at a first one of the circular end faces of the dielectric region; and*

*a flexible electrode facing a second one of the circular end faces of the dielectric region and pressible by a pressing member to vary a distance between at least a portion of the flexible electrode and the second circular end face of the dielectric region.*

*24. The variable capacity condenser according to claim 23, wherein the two electrodes are disposed on the at least one dielectric substance.*

*25. The variable capacity condenser according to claim 23, wherein the two electrodes are disposed at two semicircular halves of the first circular end face of the dielectric region.*

*26. A variable capacity condenser usable in an electric pointing device, the condenser comprising:* a dielectric region of an electric pointer, the dielectric region having a disc shape defined by a dielectric substance disposed therein, the disc-*shaped dielectric region having upper and lower end portions and a side portion connected between the upper and lower end portions;*

*two electrodes disposed at the upper end portion of the dielectric region; and*

*a flexible conductive member facing the lower end portion of the dielectric region; and*

*pressible by a pressing member to vary a distance between at least a portion of the flexible electrode and the lower end portion of the dielectric region.*

*27. The variable capacity condenser according to claim 26, wherein the dielectric substance has a disc shape.*

*28. A variable capacity condenser comprising:*

*a dielectric region of an electric pointer having two end portions, the dielectric region including at least two different dielectrics;*

*two electrodes disposed at one end portion of the dielectric region; and*

*a flexible conductive member facing the other end portion of the dielectric region; and*

*pressible by a pressing member to vary a distance between at least a portion of the flexible electrode and an the other end portion of the dielectric region.*

*29. The variable capacity condenser according to claim 28, wherein the dielectric region has a disc shape with the two end portions disposed on opposite sides of a circumferential side portion.*

*30. A variable capacity condenser comprising:*

*a dielectric component of an electric pointer device having two end faces;*

*two electrodes disposed on one end face of the dielectric component; and*

*a flexible electrode facing the other end face of the dielectric component and pressible by a pressing member to vary a distance between at least a portion of the flexible electrode and the other end face of the dielectric component.*

*31. The variable capacity condenser according to claim 30, wherein the dielectric component comprises at least two different dielectrics.*

*32. A variable capacity condenser comprising:*

*a generally circular dielectric component of an electric pointer device having upper and lower end portions;*

*a ring shaped spacer disposed beneath the lower end portion of the dielectric component;*

*first and second electrodes disposed on the upper end portion of the dielectric component; and*

*a circular flexible electrode disposed beneath the ring shaped spacer to face the lower end portion of the dielectric component, the flexible electrode being pressible to vary a distance between at least a portion of the flexible electrode and the first and second electrodes.*

*33. A variable capacity condenser usable with an electric pointer, the condenser comprising:*

*a first capacity condenser having a first dielectric portion, a first upper electrode disposed on the first dielectric portion, and a first lower electrode portion disposed beneath the first dielectric portion; and*

*a second capacity condenser disposed adjacent to the first capacity condenser and having a second dielectric portion, a second upper electrode disposed on the second dielectric portion, and a second lower electrode portion disposed beneath the second dielectric portion,*

*wherein the first and second lower electrode portions are movable with respect to the first and second upper electrode portions, respectively, to change capacities therebetween.*

*34. The variable capacity condenser according to claim 33, wherein the first and second dielectric portions comprises a generally circular dielectric component.*

*35. The variable capacity condenser according to claim 33, wherein the first and second dielectric portions comprise a dielectric disc.*

*36. The variable capacity condenser according to claim 33, wherein the first and second dielectric portions comprise semicircular dielectric components.*

*37. The variable capacity condenser according to claim 36, wherein the first and second upper electrodes comprise semicircular flat electrodes disposed on the corresponding semicircular dielectric components.*

*38. A variable capacity condenser comprising:*

*an integrated capacitor of an electric pointer, the integrated capacitor including at least two individual electrodes, a movable common electrode movable with respect to the individual electrodes, and dielectric disposed between the individual electrodes and the movable common electrode, the movable common electrode being movable by operation of the electric pointer such that a distance between the movable common electrode and the individual electrodes is varied.*

*39. The variable capacity condenser according to claim 38, wherein the movable common electrode comprises a flexible conductive member spaced apart from the dielectric, and the individual electrodes are disposed on the dielectric and have shapes that correspond to different halves of the flexible electrode.*

*40. The variable capacity condenser according to claim 38, wherein the dielectric includes at least two different dielectrics.*

*41. A variable capacity condenser comprising:*

*a generally circular dielectric component of an electric pointer device having two end faces;*

*two electrodes disposed on one end face of the dielectric component; and*

*a flexible electrode facing the other end face of the dielectric component and pressible by a pressing member to vary a distance between at least a portion of the flexible electrode and the other end face of the dielectric component.*

*42. A variable capacity condenser comprising:*

*a dielectric region of an electric pointer, the dielectric region having two end portions;*

*a dielectric substance;*

*two electrodes at one of the end portions of the dielectric region, and*

*a conductive elastic material at the other end portion,*

*wherein, the conductive elastic material at one end portion is flexible by a control with which a distance is altered between at least one electrode at one end portion and the conductive elastic material at the other end portion of the dielectric region, and*

*wherein, the capacity of the variable capacity condenser changes in relation to changes in said distance.*

*43. The variable capacity condenser according claim 42, further comprising a spacer positioned between the other end portion of the dielectric region and the conductive elastic material.*

*44. The variable capacity condenser according to claim 42, wherein the dielectric substance has a disc shape that defines the shape of the dielectric region.*

*45. A variable capacity condenser, comprising:*

*a dielectric region of an electric pointer defined by at least one dielectric substance disposed therein, the dielectric region having a substantially cylindrical shape with a circumferential side portion and circular end faces disposed on opposite sides of the circumferential side portion;*

*two electrodes disposed at a first one of the circular end faces of the dielectric region; and*

*a third electrode facing a second one of the circular end faces of the dielectric region,*

*wherein, the third electrode is movable by a control with which a distance is altered between the third electrode and the second one of the circular end faces of the dielectric region, and*

*wherein, the capacity of the variable capacity condenser changes in relation to alterations in said distance.*

*46. The variable capacity condenser according to claim 45, wherein the two electrodes are disposed on the at least one dielectric substance.*

*47. The variable capacity condenser according to claim 45, wherein the two electrodes are disposed at two semicircular halves of the first circular end face of the dielectric region.*

*48. The variable capacity condenser according to claim 45, wherein the third electrode is flexible.*

*49. A variable capacity condenser usable in an electric pointing device, the condenser comprising:*

*a dielectric region of an electric pointer, the dielectric region having a disc shape defined by a dielectric substance disposed therein, the disc-shaped dielectric region having upper and lower end portions and a side portion connected between the upper and lower end portions;*

*two electrodes disposed at the upper end portion of the dielectric region; and*

*a third electrode facing the lower end portion of the dielectric region,*

*wherein, the third electrode is movable by a control with which a distance is altered between the third electrode and the second one of the circular end faces of the dielectric region, and*

*wherein, the capacity of the variable capacity condenser changes in relation to changes in said distance.*

*50. The variable capacity condenser according to claim 49, wherein the dielectric substance has a disc shape.*

*51. The variable capacity condenser according to claim 49, wherein the third electrode is flexible.*

*52. A variable capacity condenser comprising:*

*a dielectric component of an electric pointer device having two end faces;*

*two electrodes disposed on one end face of the dielectric component; and*

*a movable electrode facing the other end face of the dielectric component,*

*wherein, the movable electrode is actuated by a control to vary a distance between at least a portion of the movable electrode and the other end face of the dielectric component, and*

*wherein, the capacity of the variable capacity condenser changes in relation to changes in said distance.*

*53. The variable capacity condenser according to claim 52, wherein the dielectric component comprises at least two different dielectrics.*

*54. The variable capacity condenser according to claim 52, wherein the movable electrode is flexible.*

*55. A variable capacity condenser comprising:*

*a generally circular dielectric component of an electric pointer device having upper and lower end portions;*

*a ring shaped spacer disposed beneath the lower end portion of the dielectric component;*

*first and second electrodes disposed on the upper end portion of the dielectric component; and*

*a circular movable electrode disposed beneath the ring shaped spacer to face the lower end portion of the dielectric component, the movable electrode being pressible to vary a distance between at least a portion of the movable electrode and the first and second electrodes.*

*56. The variable capacity condenser according to claim 55, wherein the movable electrode is flexible.*

* * * * *